(12) United States Patent
Mohamed et al.

(10) Patent No.: US 12,412,085 B2
(45) Date of Patent: Sep. 9, 2025

(54) DATA AND COMPUTE EFFICIENT EQUIVARIANT CONVOLUTIONAL NETWORKS

(71) Applicant: QUALCOMM Incorporated, San Diego, CA (US)

(72) Inventors: Mirgahney Husham Awadelkareem Mohamed, Amsterdam (NL); Gabriele Cesa, Diemen (NL); Taco Sebastiaan Cohen, Amsterdam (NL); Max Welling, Bussum (NL)

(73) Assignee: QUALCOMM Incorporated, San Diego, CA (US)

( * ) Notice: Subject to any disclaimer, the term of this patent is extended or adjusted under 35 U.S.C. 154(b) by 1124 days.

(21) Appl. No.: 17/170,745

(22) Filed: Feb. 8, 2021

(65) Prior Publication Data

US 2021/0248467 A1 Aug. 12, 2021

Related U.S. Application Data

(60) Provisional application No. 62/971,047, filed on Feb. 6, 2020.

(51) Int. Cl.
| | |
|---|---|
| *G06N 3/08* | (2023.01) |
| *G06F 9/345* | (2018.01) |
| *G06F 18/213* | (2023.01) |
| *G06F 18/214* | (2023.01) |
| *G06V 10/44* | (2022.01) |

(Continued)

(52) U.S. Cl.
CPC ............ *G06N 3/08* (2013.01); *G06F 9/3455* (2013.01); *G06F 18/213* (2023.01); *G06F 18/214* (2023.01); *G06V 10/454* (2022.01); *G06V 10/764* (2022.01); *G06V 10/82* (2022.01)

(58) Field of Classification Search
CPC .......... G06N 3/08; G06N 3/045; G06N 3/063; G06F 9/3455; G06F 18/213; G06F 18/214; G06F 18/2413; G06V 10/454; G06V 10/764; G06V 10/82
See application file for complete search history.

(56) References Cited

U.S. PATENT DOCUMENTS

| | | | |
|---|---|---|---|
| 11,468,314 B1 | 10/2022 | Singh et al. | |
| 11,514,720 B2 * | 11/2022 | Haimovitch-Yogev | G06V 40/165 |
| 2018/0068463 A1 * | 3/2018 | Risser | G06T 7/45 |

(Continued)

OTHER PUBLICATIONS

Same, Same But Different: Recovering Neural Network Quantization Error Through Weight Factorization Eldad et al. (Year: 2019).*

(Continued)

*Primary Examiner* — Viker A Lamardo
*Assistant Examiner* — Ababacar Seck
(74) *Attorney, Agent, or Firm* — Patterson & Sheridan LLP

(57) ABSTRACT

Certain aspects of the present disclosure provide a method of performing machine learning, comprising: generating a neural network model; and training the neural network model for a task with a first set of input data, wherein: the training uses a total loss function $\mathcal{L}_{total}$ including an equivariance loss component $\mathcal{L}_{equivarnace}$ according to $\mathcal{L}_{total} = \mathcal{L}_{task} + \alpha \mathcal{L}_{equivarnace}$, and $\alpha > 0$.

28 Claims, 10 Drawing Sheets

(51) Int. Cl.
*G06V 10/764* (2022.01)
*G06V 10/82* (2022.01)

(56) References Cited

U.S. PATENT DOCUMENTS

| | | | |
|---|---|---|---|
| 2019/0050682 A1* | 2/2019 | Sutic | G06V 30/19147 |
| 2019/0205758 A1* | 7/2019 | Zhu | G06V 20/695 |
| 2020/0193296 A1* | 6/2020 | Dixit | G06N 3/063 |
| 2020/0196011 A1 | 6/2020 | Wyatte et al. | |
| 2020/0320401 A1* | 10/2020 | Jampani | G06N 3/047 |
| 2021/0027098 A1 | 1/2021 | Ge et al. | |
| 2021/0089901 A1* | 3/2021 | Smeulders | G06N 3/08 |
| 2021/0272233 A1* | 9/2021 | Kondor | G06F 17/14 |
| 2022/0014723 A1* | 1/2022 | Pandey | G06T 5/60 |
| 2022/0036155 A1* | 2/2022 | Guevara | G06N 3/044 |
| 2022/0309773 A1* | 9/2022 | Herman | G06N 3/08 |

OTHER PUBLICATIONS

A Rotation-Equivariant Convolutional Neural Network Model of Primary Visual Cortex Ecker et al. (Year: 2018).*
A Quantization-Friendly Separable Convolution for MobileNets Sheng et al. (Year: 2019).*
Convolutional Conditional Neural Processes Gordon et al. (Year: 2020).*
Group Equivariant Convolutional Networks Cohen et al. (Year: 2016).*
Understanding Image Representations by Measuring Their Equivariance and Equivalence Lenc et al. (Year: 2018).*
Learning Steerable Filters for Rotation Equivariant CNNs Weiler et al. (Year: 2018).*
Exploiting Cyclic Symmetry in Convolutional Neural Networks Dieleman et al. (Year: 2016).*
CubeNet: Equivariance to 3D Rotation and Translation Worrall et al. (Year: 2018).*
Making Convolutional Networks Shift-Invariant Again Richard Zhang (Year: 2019).*

* cited by examiner

DATA AND COMPUTE EFFICIENT EQUIVARIANT CONVOLUTIONAL NETWORKS

CROSS-REFERENCE TO RELATED APPLICATIONS

This Application claims the benefit of and priority to U.S. Provisional Patent Application No. 62/971,047, filed on Feb. 6, 2020, the entire contents of which are incorporated herein by reference.

INTRODUCTION

Aspects of the present disclosure relate to improved machine learning techniques, and in particular to systems and methods for implementing efficient equivariant convolutional neural networks.

Machine learning techniques, such as deep learning, have proven a powerful tool in many domains. Given their computational complexity, though, machine learning tasks, such as training and inferencing, have conventionally been performed on powerful, purpose-built computing hardware. Presently, there is a desire to implement machine learning tasks on lower power devices, such as edge devices, in order to enhance the capabilities of such devices and the services they enable. For example, the wide availability and variety of mobile devices and Internet-of-Things (IoT) devices represents a compelling opportunity for deploying machine learning in myriad new contexts.

However, implementing complex machine learning tasks on lower power devices creates new challenges with respect to the design constraints of such devices, such as with respect to power consumption, computational efficiency, and memory footprint, to name a few examples. Consequently, improving the efficiency of various machine learning model architectures has been an area of focused research and development. Unfortunately, efficient architectures, by themselves, may not be sufficient to enable complex machine learning tasks to be implemented on low power devices especially where large models and/or time consuming computations are necessary to get good performance for some particular task.

Raw computational power is not the only limiting resource for deployment of machine learning models in new domains. A further challenge is gathering large quantities of labelled data for training such models.

The aforementioned challenges and others have kept the power of machine learning from achieving its full reach and potential. Accordingly, what are needed are data and compute efficient machine learning techniques.

BRIEF SUMMARY

In a first aspect, a method of performing machine learning includes: generating a neural network model; and training the neural network model for a task with a first set of input data, wherein: the training uses a total loss function $\mathcal{L}_{total}$ including an equivariance loss component $\mathcal{L}$ equivarnace according to $\mathcal{L}_{total} = \mathcal{L}_{task} + \alpha \mathcal{L}_{equivarnace}$, and $\alpha > 0$.

In a second aspect, a processing system includes a memory comprising computer-executable instructions and one or more processors configured to execute the computer-executable instructions and cause the processing system to perform a method of performing machine learning includes: generating a neural network model; and training the neural network model for a task with a first set of input data, wherein: the training uses a total loss function $\mathcal{L}_{total}$ including an equivariance loss component $\mathcal{L}_{equivarnace}$ according to $\mathcal{L}_{total} = \mathcal{L}_{task} + \alpha \mathcal{L}_{equivarnace}$, and $\alpha > 0$.

In a third aspect, a non-transitory computer-readable medium includes computer-executable instructions that, when executed by one or more processors of a processing system, cause the processing system to perform a method of performing machine learning includes: generating a neural network model; and training the neural network model for a task with a first set of input data, wherein: the training uses a total loss function $\mathcal{L}_{total}$ including an equivariance loss component $\mathcal{L}$ equivarnace according to $\mathcal{L}_{total} = \mathcal{L}_{task} + \alpha \mathcal{L}_{equivarnace}$, and $\alpha > 0$.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
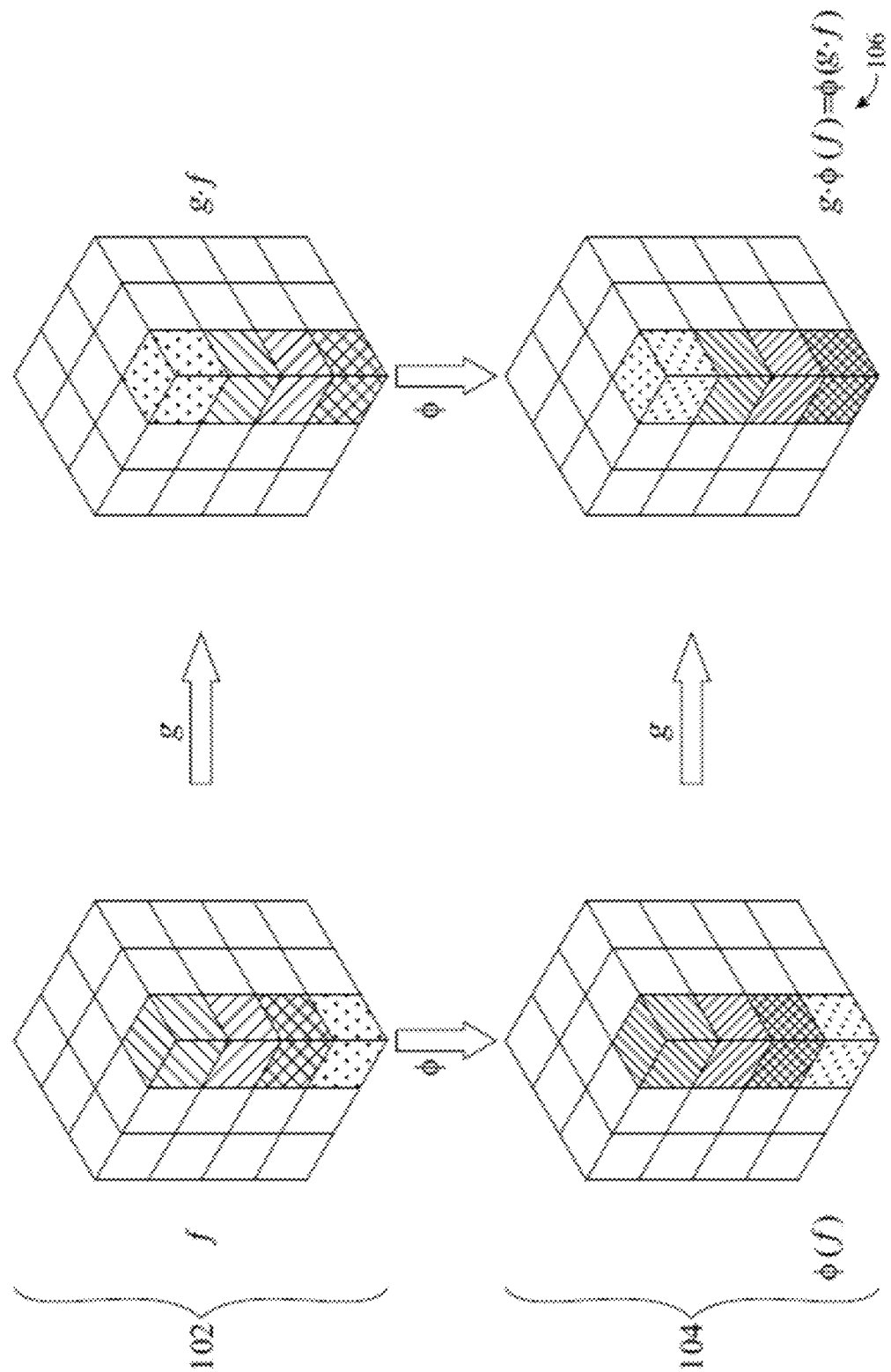
FIG. 1 depicts an example of action of a group element on a convolutional feature field.

Aspects of the present disclosure provide apparatuses, methods, processing systems, and computer-readable mediums for implementing efficient equivariant convolutional neural networks.

Equivariance is generally a form of symmetry for functions from one symmetric space to another. A function is said to be an equivariant map when its domain and codomain are acted on by the same symmetry group, and when the function commutes with the action of the group.

Conventional convolutional neural networks (CNNs) may be translation equivariant, but they are not rotation equivariant. Consequently, symmetries in the data are not able to be exploited under rotation. For example, it is appealing to take a labeled image and rotate it to different angles to create additional labeled training data-since the rotation does not change the inherent label. Unfortunately, a traditional CNN may not return the correct label because the rotation changes the output of the conventional CNN. Thus, conventional CNNs may not be considered training data efficient.

Embodiments described herein overcome this issue by utilizing group equivariant convolutional neural networks (G-CNNs). Beneficially, various existing architectures, such as for image classification and segmentation, can be adapted to have equivariance without significant architectural changes. Whether implemented in a new or existing architecture, equivariance beneficially guarantees predetermined transformations of model outputs under corresponding transformations of model input signals, including rotations. Thus, G-CNNs generalize more effectively over transformed signals, such as rotated input signals compared to conventional CNNs. This improved data efficiency is especially useful when little data is available. For example, equivariant neural networks may be particularly useful in the medical domain where symmetries in medical imaging can be exploited to build more robust models and to overcome the scarcity of labeled data.

While extremely effective, G-CNN models are commonly implemented using large and computationally expensive architectures, not suitable for low-powered devices, such as mobile devices, edge devices, IoT devices, and the like. Embodiments described herein overcome the aforementioned challenges using computationally efficient equivariant convolutional neural network models, which utilize a new equivariance loss term that contributes to a generalized regularization. The regularization loss term beneficially enforce symmetries without large and computationally expensive architectures. Further, the equivariance loss term not only improves the preservation of equivariance, but it also beneficially improves the overall loss of models with which it is implemented.

Embodiments described herein may additionally use quantization to further increase the efficiency of equivariant convolutional neural network models utilizing the equivariance loss term without harming the equivariant properties of such models.

Thus, embodiments described herein beneficially enable deployment of efficient equivariant convolutional neural network models even in a limited computational resources and small model regime.

Structured & Equivariant Representations in Deep Neural Networks

A neural network generally refers to an interconnected group of processing nodes (e.g., neuron models, etc.) that collectively operate as a process that controls a function of a computing device or generates a neural network inference. Individual nodes in a neural network generally receive input data, perform operations on the input data to generate output data, and pass the output data (also called "activation") to the next node in the network. Each node may be associated with a weight value that defines or governs the relationship between input data and activation. The weight values may be determined during a training phase and iteratively updated as data flows through the neural network.

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit (ReLU) that cuts off activations having values below zero, etc.) between the layers. The first layer of nodes of a deep neural network may generally be referred to as an input layer. The final layer of nodes may generally be referred to as an output layer. The layers in-between the input and final layer may be referred to as intermediate layers, hidden layers, or black box layers.

Deep neural networks produce a sequence of progressively more abstract representations through their hidden layers. In conventional neural networks, the representation spaces are usually endowed with very minimal internal structure, such as that of a linear space $\mathbb{R}^n$.

However, a representation space can obtain its structure from other representation spaces to which it is connected. For this to work, the network or layer $\Phi$ that maps one representation to another should be structure preserving. For example, for a space transformed via a transformation g (e.g., a "G-space"), $\Phi$ has to be equivariant according to:

$$\Phi(T_g x) = T_g' \Phi(x)$$

That is, transforming an input x by a transformation g (forming $T_g x$) and then passing it through the learned map $\Phi$ should give the same result as first mapping x through $\Phi$ and then transforming the representation with g.

Equivariance can be realized in many ways, and the operators T and T' need not be the same. The only requirement for T and T' is that for any two transformations g and h, $T(gh) = T(g)T(h)$. Invariance is thus a special kind of equivariance where $T_g'$ is the identity transformation for all g.

In deep learning, general equivariance is more useful than invariance because it is impossible to determine if features are in the right spatial configuration if they are invariant.

Applying equivariance to symmetry transformations in a deep neural network beneficially constrains the network in a way that can aid generalization. For example, a network $\Phi$ can be non-injective, meaning that non-identical vectors x and y in the input space become identical in the output space (for example, two instances of a face may be mapped onto a single vector indicating the presence of any face). If $\Phi$ is equivariant, then the G-transformed inputs $T_g x$ and $T_g y$ must also be mapped to the same output. Their "sameness" (as judged by the network) is preserved under symmetry transformations.

Brief Introduction to Group Equivariant Neural Networks

Formally, a neural network $\Phi$ may be interpreted as a sequence of n layers $$\{\phi_i\}_{i=1}^n,$$

each mapping from an input feature space $F_{i-1}$ to an output feature space $F_i$. Generally, a feature space is the vector space containing the features produced by a layer of the network. In many cases, prior knowledge about the symmetries of the space $F_0$ of the input data is available. For instance, a medical image may appear with arbitrary rotations and its label is independent of these rotations. These symmetries may generally by modelled by a group G and its action $G \times F \to F$ on a space F. It is therefore desirable to build a neural network $\Phi$ that guarantees the following equivariance property:

$$\forall g \in G, f \in F_0 \Phi(g \cdot f) = g \cdot \Phi(f),$$

where the actions of $g \in G$ on the input and on the output of $\Phi$ do not need to be the same.

One approach to achieve this is by enforcing equivariance at each layer $\phi_i$ of the network. This requires the definition of an action of the group on each intermediate feature space $F_i$. In the case of a 2D convolutional neural network, a feature map $f \in \mathbb{R}^{c \times h \times w}$ can be interpreted as a feature field f: $X \to \mathbb{R}^c$, i.e. a function associating a c-dimensional feature vector to each point in a base space X (e.g., the plane $\mathbb{R}^2$ for planar images). The action of a group G on a convolutional feature field f is thus defined as:

$$\forall g \in G, x \in X[g \cdot f](x) = \rho(g) f(g^{-1} \cdot x),$$

where the rotation $g \in G$ moves the pixels in the plane ($g^{-1} \cdot x$) and transforms the channels of the feature map by multiplying each feature vector $f(\cdot) \in \mathbb{R}^c$ by a matrix $\rho(g) \in \mathbb{R}^{c \times c}$. The map p: $G \to \mathbb{R}^{c \times c}$ is a group representation of the elements G as linear actions (e.g., matrices) on the channels and its choice defines the type (the transformation law) of the field f.

FIG. 1 depicts an example action of a group of N=4 rotations acting on a feature f. Specifically, a group element $g \in G$ acts on a convolutional feature f containing c=1 block, as depicted in the first row 102, where $$g = \frac{\pi}{2}$$

moves the pixels on the plane and circularly shifts the N channels in the same block. g acts similarly on the output $\Phi(f)$ as depicted in the second row 104, where $\Phi$ indicates neural network, such as a convolutional neural network, and the action of the neural network on the input is depicted by a change in the depicted patterns. If CD is equivariant, it commutes with these two actions, as depicted at 106.

Generally, a group representation associates each group element with an invertible matrix such that the multiplication of the matrix representations of different group elements behaves like the composition of the elements inside the group. Once a field type pi has been chosen for each feature field f, each layer needs to satisfy the equivariance condition with respect to the group action on its own input and output feature spaces.

For example, in the case of convolutional layers, forcing the equivariance condition with respect to the group action forces the filters to exist in a lower dimensional vector space. An equivariant convolutional filter can therefore be built by finding a basis for a vector space and learning the coefficients to linearly combine it. In other words, equivariant filters may be implemented as steerable filters, which are generally a class of filters in which a filter of arbitrary orientation is synthesized as a linear combination of a set of basis filters.

The constraints induced by the use of regular feature fields makes convolutional neural networks effectively group convolutional neural networks (G-CNNs). If equivariance is considered with respect to a group G of order $|G|=N$, this means that a feature map $f: \mathbb{R} \to \mathbb{R}^{cN}$ with cN channels is split into c blocks $f_i: \mathbb{R}^2 \mathbb{R}^N$ of N channels, each transforming according to the regular representation $\rho_{reg}$: $G \to \mathbb{R}^{N \times N}$ of the group (i.e. a permutation of the N channels). For a particular convolution layer with input and output feature field types $$\rho_{in} = \bigoplus_{i=1}^{c_{in}} \rho_{reg} : G \to \mathbb{R}^{c_{in} N \times c_{in} N}$$

and $$\rho_{out} = \bigoplus_{j=1}^{c_{out}} \rho_{reg} : G \to \mathbb{R}^{c_{out} N \times c_{out} N},$$

the convolution kernel $\varkappa: \mathbb{R}^2 \to \mathbb{R}^{c_{in} N \times c_{out} N}$ decomposes in $(c_{in}) \times (c_{out})$ blocks $k_{i,j}: \mathbb{R}^2 \to \mathbb{R}^{N \times N}$. Each block $k_{i,j}$ performs group convolution.

Because equivariance constraints only need to be enforced during training, an equivariant model can be converted to a conventional architecture at test time. Hence, post-processing techniques designed for conventional networks can be applied on top of a model trained with equivariant constraints.

Notably, in an equivariant network, equivariant convolutional filters are constructed by linearly combining a set of basis filters. The network learns the weights to do this linear combination. In the forward pass, this linear combination is performed to build the filter and then normal convolution is run with it. During testing, this linear combination is not required anymore because the weights are not changing, so the convolutional filter is stored only once.

Maintaining Equivariance in Depth-Wise Separable Convolution

Machine learning tasks such as classification often use convolutional neural networks to extract many layers of features from the input data to improve the classification of the output. In particular, spatially separable convolutions, such as a depth-wise separable convolution, are very useful for classification.

Generally, a spatial separable convolutions may be factorized into two components: (1) a depth-wise separable convolution, wherein each spatial channel is convolved independently by a depth-wise convolution (e.g., a spatial fusion); and (2) a pointwise convolution, wherein all the spatial channels are linearly combined (e.g., a channel fusion). Generally, during spatial fusion, a network learns features from the spatial planes and during channel fusion the network learns relations between these features across channels.

Considering the block structure of the equivariant convolutional layer defined above, grouped equivariant convolution can be built by using only the N×N blocks $k_{i,j}$ in the diagonal. However, some models use depth-wise convolution with blocks of size 1, which corresponds to convolutional kernels with a diagonal structure. This requires imposing a stronger constraint on the space of filters.

Grouped depth-wise convolution with more filter-groups than the number of regular fields in the feature maps cannot be readily implemented in the form of a group convolution. Nevertheless, because the main diagonal of a regular-to-regular steerable filter contains rotated versions of a single unconstrained filter, the space of such diagonal kernels in depth-wise convolution corresponds to the space of scalar-to-regular filters.

Additional care needs to be taken in order to preserve equivariance in certain implementations of depth-wise separable convolution, such as when downsampling feature maps in a convolutional layer using a strided convolution.

Figure 2:
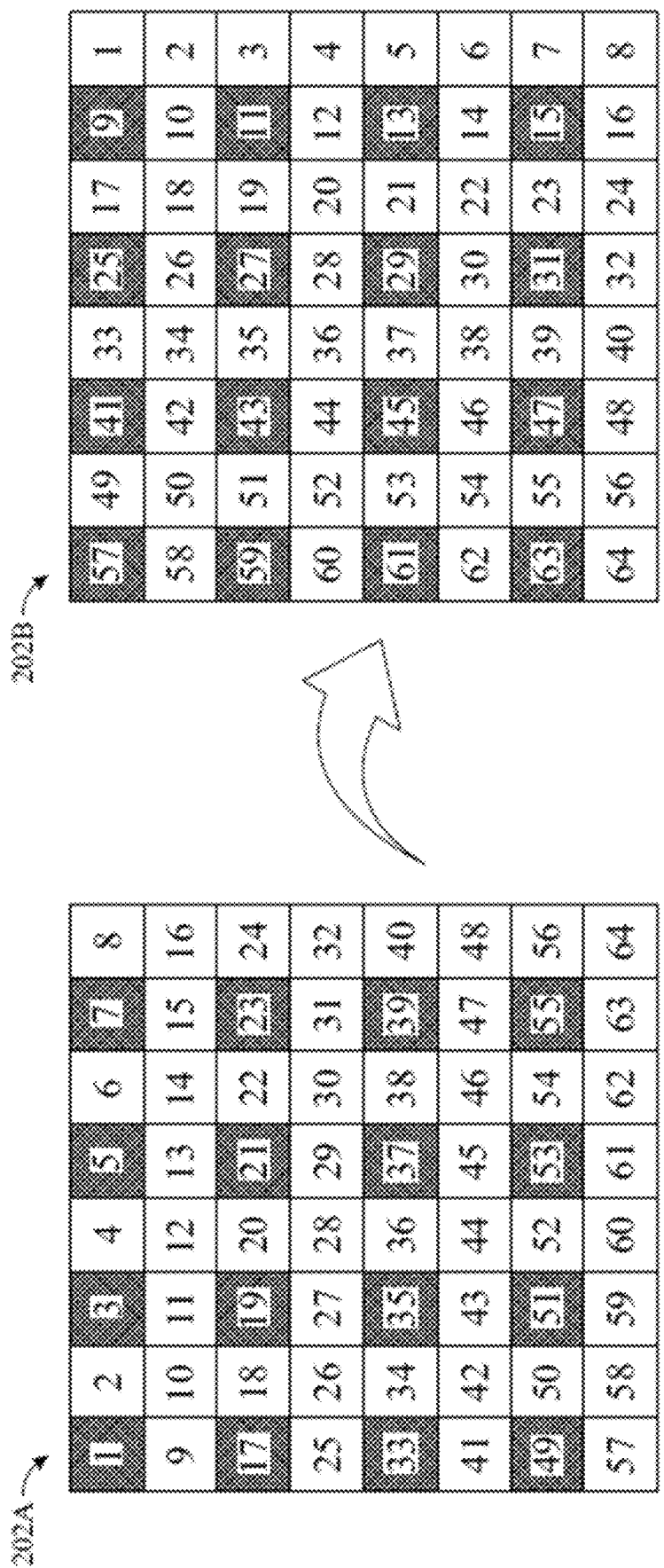
FIG. 2 depicts an example convolution with padding and stride over an even-sized feature map.

For example, as depicted in FIG. 2, a 3×3 convolution with padding 1 and stride 2 over an even-sized feature map will sample different points when the feature map is rotated by 90 degrees as depicted by the different shaded boxes in 202A versus 202B. Thus, the strided convolution in this example breaks equivariance on the even-sized feature map because it samples different points when the input is rotated as depicted by the different shaded squares in feature maps 202A and 202B, which causes a different output.

In order to preserve 90 degree rotation equivariance, an odd-sized input may be used and the stride and padding of convolution layers may be adjusted to maintain odd-sized pixel grids. So, for example, given an input feature map of shape (2n+1)×(2n+1), a 3×3 convolution with stride 2 produces a grid of shape n×n when no padding is used or a grid of shape (n+1)×(n+1) if padding is used. Because one of n or n+1 is an odd number, padding can be chosen accordingly to ensure the odd-sized input. While this is not enough, alone, to guarantee perfect rotation equivariance to arbitrary angles, it does improve the stability of an equivariant convolutional neural network model even on smaller rotations.

Figure 3:
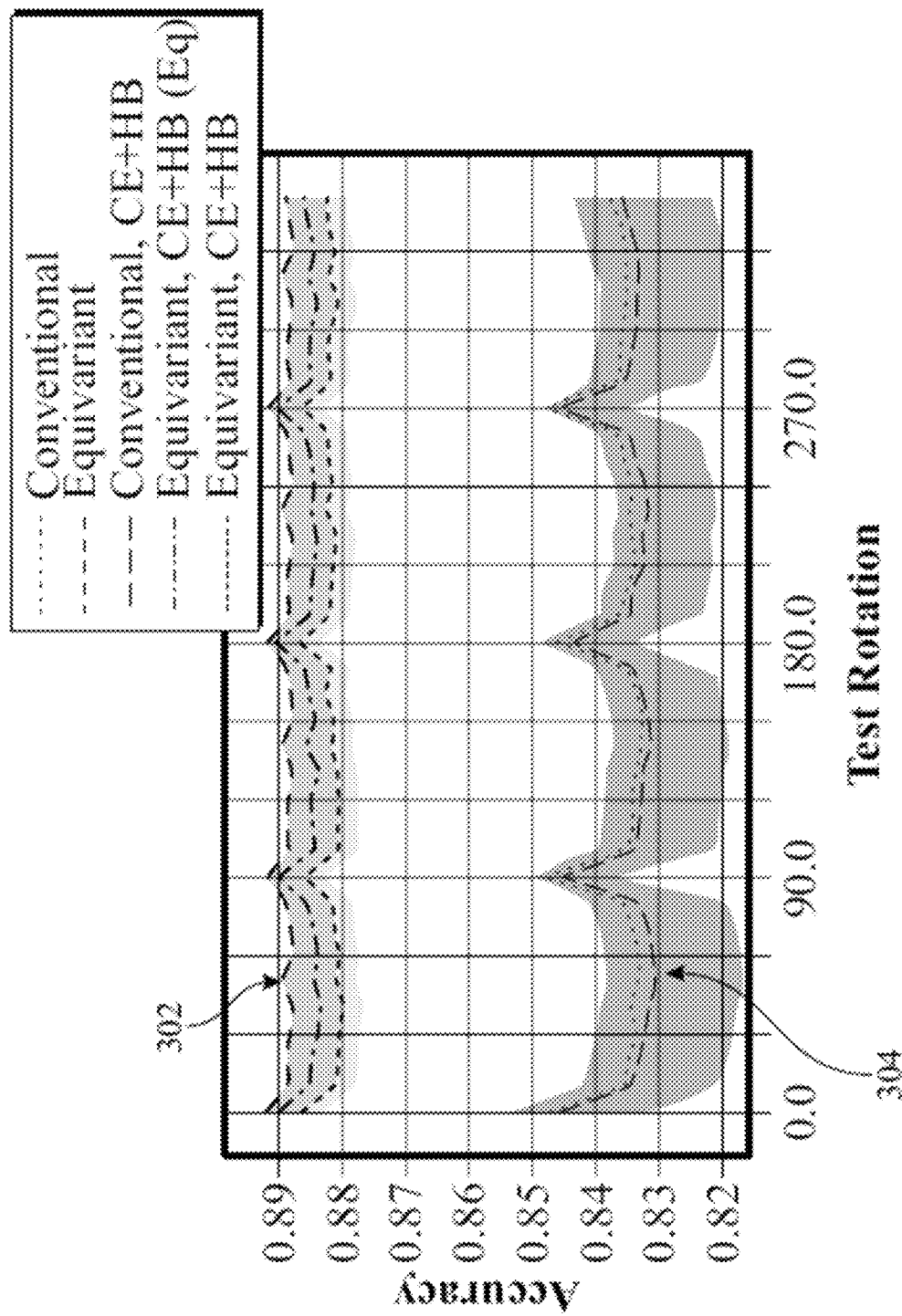
FIG. 3 depicts an example of the accuracy and stability improvement in a convolutional neural network model configured for image classification using odd-sized input with stride and padding optimization

FIG. 3 depicts an example of the accuracy and stability improvements in a convolutional neural network model configured for image classification using odd-sized input with stride and padding optimization. Notably, the results 302 for the equivariant model are significantly more stable and accurate compared to the conventional convolutional neural network model 304 where equivariance is not enforced. Further, even after cross-range equalization (CE) and high-bias absorption (HB), described further below, the equivariant models significantly outperform the conventional models.

Notably, rotations by angles which are not a multiple of 90 degrees necessarily move pixels outside the borders of the pixel grid, leading to a loss in the information content of the input. As a result, the output of an equivariant module should not rely on these pixels, but only on the central disk inscribed in the grid.

Figure 4:
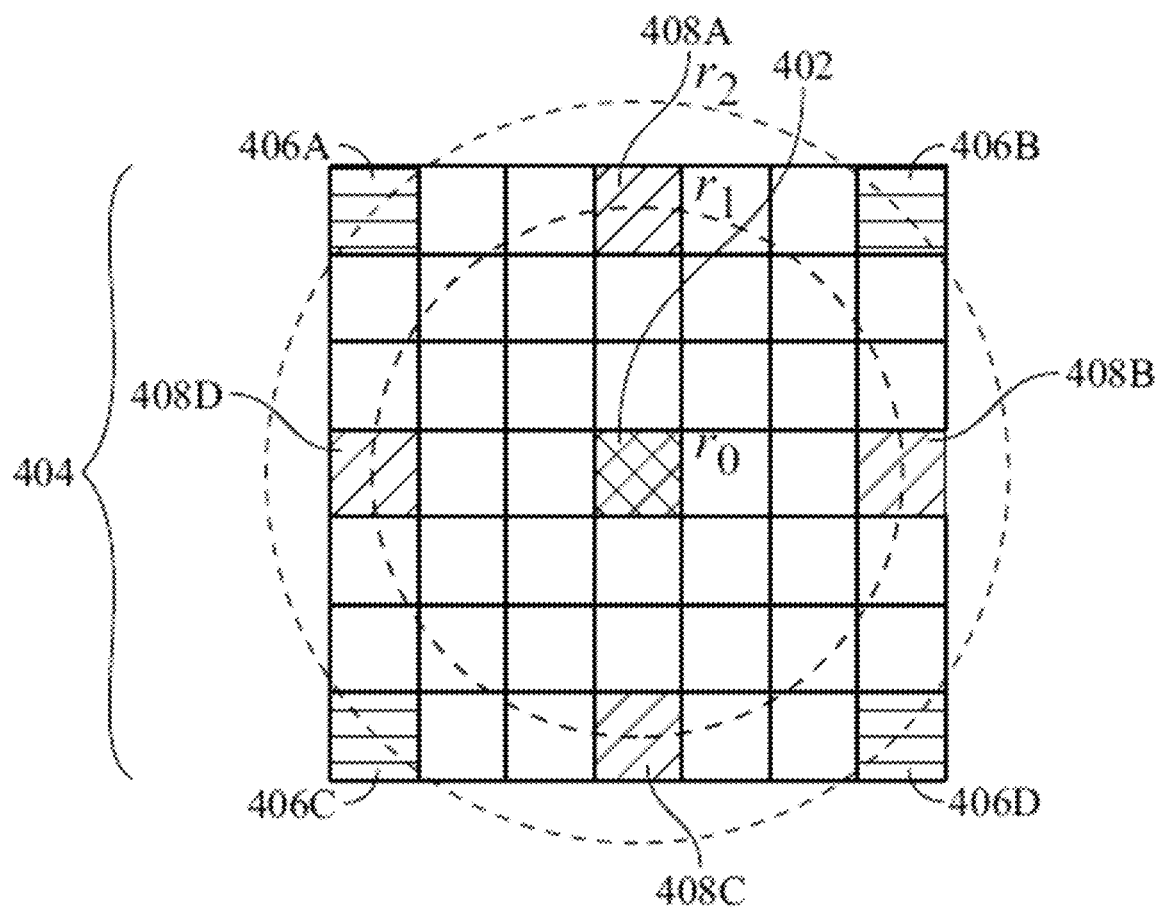
FIG. 4 depicts an example of steerable dilated filters.

FIG. 4 depicts an example of the orbit of a pixel under rotations. In particular, FIG. 4 shows that pixels 406A-D, having a radius $r_2$ from center point 402, will fall outside of the grid 404 when rotating by an angle <90 degrees. By contrast, pixels 408A-D, having a radius $r_1$ from center point 402, will not fall outside of the grid 404 when rotating by an angle <90 degrees.

Further, the square shape of the pixel grid is also a problem in the ground truth and the predicted segmentation masks, as well as in the inner layers. Indeed, using padded convolution on these grids permits a convolutional kernel placed on the borders to distinguish the vertical and horizontal orientations from the others, potentially breaking the guaranteed equivariance. In practice, usually this is not a problem when the training data contains the enforced symmetries, though it can affect the overall stability of the model, especially when dilated filters are used on small resolution images as in an Atrous Spatial Pyramid Pooling (ASPP) layer.

In order to enforce the symmetry of the images and the labels, a circular binary mask may be applied to the input and output of a model and to the ground truth segmentation masks. To improve the stability of the model, a similar mask may also be applied to the feature maps which are fed to the ASPP layer.

Dilated Steerable Filters

Atrous Spatial Pyramid Pooling (ASPP) offers an efficient way to process convolutional features at different scales, effectively increasing the field of view of the neurons. This is achieved through multiple parallel atrous convolutions with different dilations applied on the same input. ASPP layers of convolutional neural networks are often used in image segmentation tasks.

However, the very sparse filters in ASPP may prevent steerability, which means that naively converting the ASPP layer by restricting the space of filters to the equivariant sub-space is not enough to guarantee equivariance. Indeed, the solutions to the equivariance constraint that defines the space of learnable filters are derived in a continuous setting, and a convolutional filter in a CNN is then a sampling of the continuous solutions on a discrete grid.

A dilated filter corresponds to a discretization with a very low sampling rate. In some of the embodiments described herein, dilation is only used with 3×3 filters. For example, FIG. 4 depicts an example of parameterization of a steerable dilated 3×3 filter with 3 rings: $r_0$, $r_1$, and $r_2$. A filter with dilation d can be decomposed into a central point $r_0=0$ and two rings at radii $r_1=\sqrt{d}$ and $r_2=d$, both uniformly sampled at four points 406A-D for $r_2$ and 408A-D for $r_1$.

In this example, the three different rings $r_0$, $r_1$, and $r_2$ are depicted with a uniform angular sampling rate (e.g., sampled at every 90 degrees). Notably, the 3×3 filter with dilation samples a larger space (the 7×7 grid), but is only able to sample at certain rotations because, for example, $r_2$ exists outside of the sample space at many rotations. Thus, conventionally it is only possible to build a sparse filter with 90 degree rotation equivariance, while it is desirable to have stronger rotational equivariance.

Because steerable filters are defined as linear combinations of a harmonic basis wherein each element is associated to a specific spatial frequency, their frequencies and their smoothness can be controlled by discarding high-frequency basis elements. For example, using the Nyquist-Shannon sampling theorem, filters with at most frequency 2 on the rings $r_1$, and $r_2$ may be used. By enforcing the maximum frequency on each of the rings, errors on all of the rings can be reduced. This helps solves the problem of having high frequency filters sampled at small sample rate.

The sampling rate of the analytical filters on the discrete grid also corresponds to the sampling rate of the input signal when convolution is performed. A similar problem can therefore arise when the input signal contains spatial high frequencies.

Ignoring for a moment translations, because the orbit of the pixels in the feature map under a rotation can move outside the sampling points of the filter, the output of a dilated convolution loses its guaranteed transformation behavior. Such filters can be rotation equivariant only if its sampling rate is sufficient to capture all the information content of the input signal. This is true only if the frequency of the signal itself is low enough. A possible solution to prevent this type of aliasing is smoothing the input signal such that it can be properly sampled by the most dilated filter in an ASPP layer. However, since ASPP uses kernels with different dilations, this would often discard too much information, which could instead be used by the smaller kernels. Indeed, ASPP could have kernels with different dilations focusing on different channels of the input signal.

In practice, high frequency features that could break equivariance because of aliasing can be ignored by the dilated filters while low frequency features can be used by the largest filters. On the other hand, high frequency features can still be exploited by the smaller and non-dilated filters, e.g. the 1×1 pointwise convolution.

Equivariance Loss as a Regularization Loss Component

In order to preserve equivariance without enforcing smoothness and discarding too much information, as above, an equivariance loss may be used as a regularization component for an equivariant model and thus can be optimized during training together with, for example, a segmentation loss when the model is designed trained for a segmentation task.

Generally, an equivariance loss can be applied to any equivariant layer whose input and output have a well-defined transformation law and, therefore, could also be used for the overall model or another layer. In some embodiments, though, the equivariance loss is applied only in the ASPP layer, which is computationally less expensive to evaluate than when applying the equivariance loss to a full model.

More specifically, assume an equivariant layer $\phi$: $F_{in} \rightarrow F_{out}$ mapping from a feature space $F_{in}$ to a feature space $F_{out}$ (not necessarily convolutional), each associated with its own transformation law (or group action). Because of equivariance, this layer should guarantee that:

$$\forall g \in G, \forall f \in F_{in} \phi(g \cdot f) = g \cdot \phi(f)$$

Thus, an equivariance loss, $\mathcal{L}_{eq}^g$, may be applied according to a mean square distance equation, such as:

$$\mathcal{L}_{eq}^g = \|g \cdot \phi(f) - \phi(g \cdot f)\|_2^2,$$

where transformation group element $g \in G$.

During batch training, identity is enforced for each batch $\{f_i\}_{i=1}^B$, where B is the batch size, by minimizing the mean square distance between its two sides for a randomly sampled group element $g \in G$, and thus $\mathcal{L}_{eq}^g$ is defined to be equal to:

$$\mathcal{L}_{eq}^g(\{f_i\}_i) := \frac{1}{B} \sum_{i=1}^B \frac{1}{C} \|g \cdot \phi(f) - \phi(g \cdot f)\|_2^2,$$

where C is the size of the vectors in Fout and B is the batch size. In the special case of convolutional feature fields over a base space X and transformation laws as described above, the loss becomes:

$$\mathcal{L}_{eq}^g(\{f_i\}_i) := \frac{1}{B \cdot C \cdot |X|} \sum_{i=1}^B \sum_{x \in X} \|[g \cdot \phi(f) - \phi(g \cdot f)](x)\|_2^2,$$

where C is the number of channels of the output features and B is the batch size. Note that this loss can only be applied on layers whose input and output transformation laws are well defined. Because conventional neural networks do not define this structure over their features, it is not possible to apply it to them. Indeed, if the loss is applied naively to a conventional CNN ignoring the transformation laws defined on the feature vectors and just rotating the feature maps spatially, it will enforce only invariant and, therefore, less expressive features. It is therefore helpful to define useful and expressive transformation laws on the channels with the representations pin and pout of the group G considered.

Figure 5:
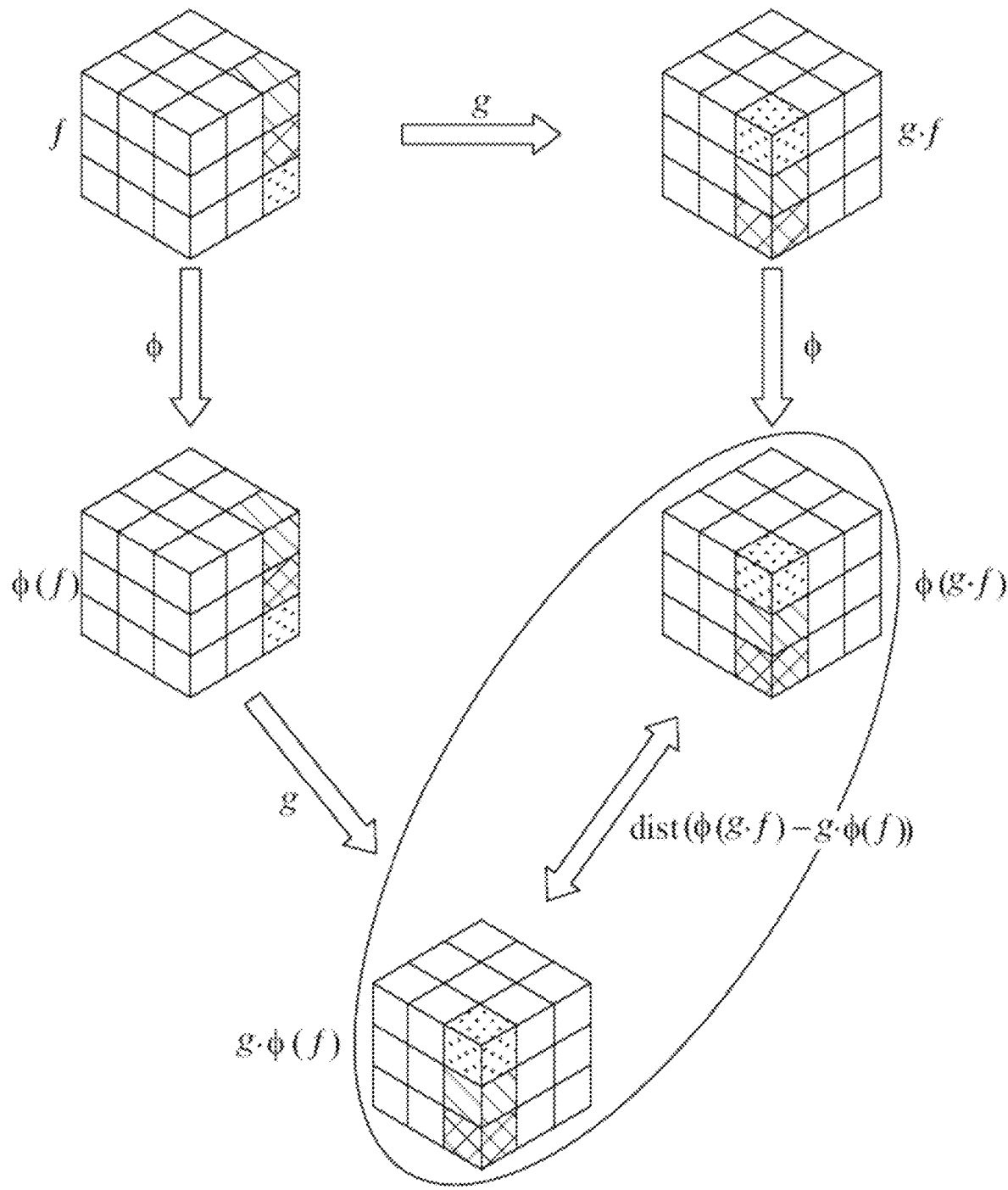
FIG. 5 depicts an example of equivariance loss enforcing the identity in a commutative diagram.

Because of the symmetry of the equivariance property, the following identity may be enforced: $\phi(f) = g \cdot \phi(g^{-1} \cdot f)$, as depicted in FIG. 5 (where, as above, the action of the neural network $\phi$ is depicted by a change in pattern weights). Because a transformation of the base space often involves interpolation (e.g., when $g \in G$ is a rotation smaller than $$\frac{\pi}{2}$$

and, therefore, introduces some noise in the results, this identity is less suited for the goal. Indeed, the double interpolation in $g \cdot \phi(g^{-1} \cdot f)$ would produce smoother outputs which then would enforce additional smoothness in the original features $\phi(f)$.

Thus, equivariant convolutional neural network models may implement an equivariance loss term to improve the performance of such models during training. For example, in a model trained for image segmentation (classification of all the pixels in the image), a combination of the segmentation loss and the equivariance loss may be evaluated on an ASPP layer, such that, for that layer:

$$\mathcal{L}_{total} = \mathcal{L}_{seg} + \alpha \mathcal{L}_{eq}^g$$

As mentioned in above, because rotations can move features outside the pixel grid (e.g., as depicted in FIG. 4), a circular mask may also be applied on the input of the ASPP layer. The same mask is also applied on the equivariance loss such that only pixels whose orbit stays inside the grid are considered for the loss calculation.

Figure 6:
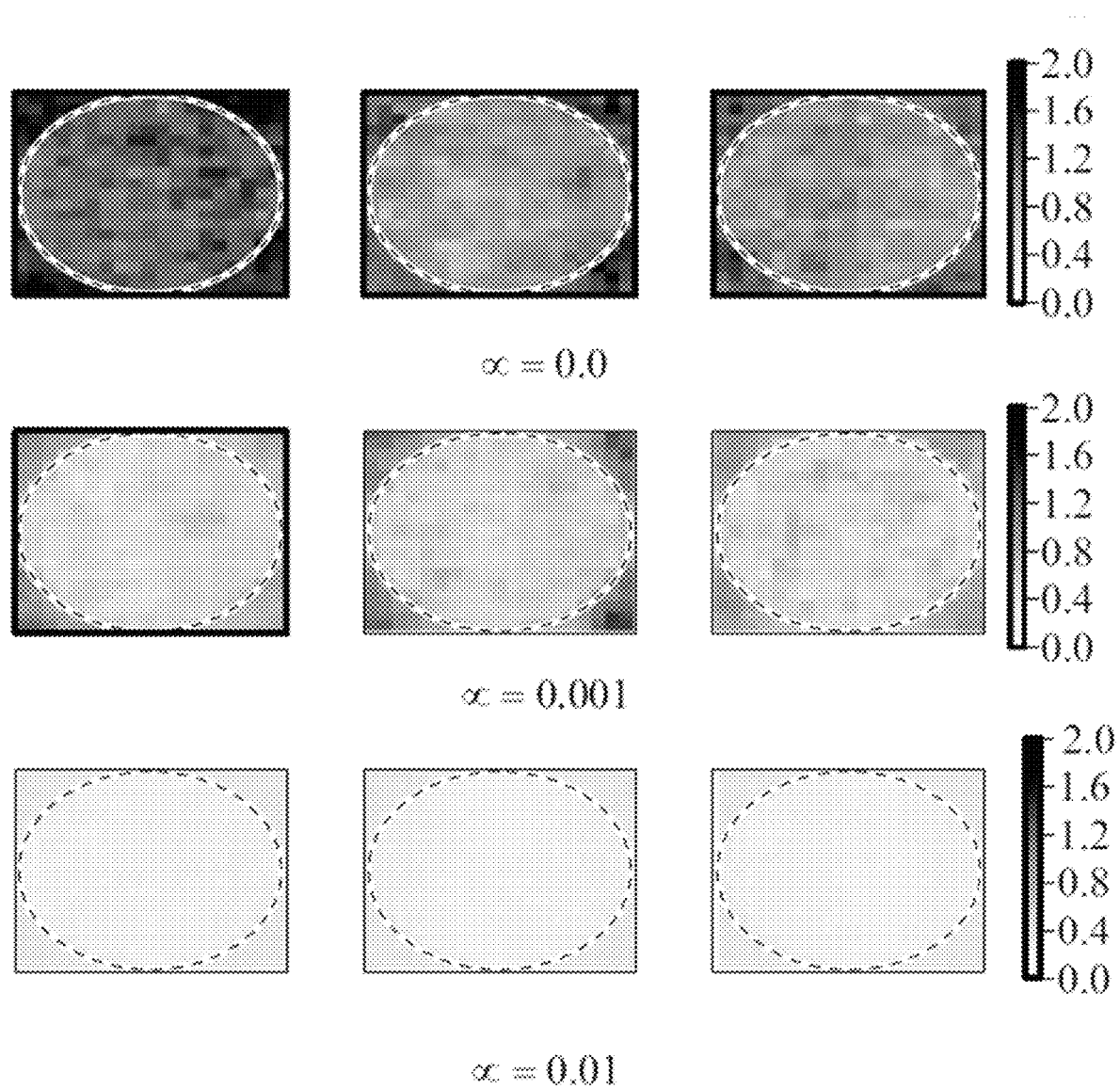
FIG. 6 depicts the effect of enforcing loss on an ASPP layer of an image segmentation model for different values of a parameter.

FIG. 6 depicts the effect of enforcing this loss on an ASPP layer of an image segmentation model for different values of a parameter a. In FIG. 6, the loss is evaluated per-pixel (i.e. per element $x \in X$) instead of being averaged over the base space and the grey scale intensity is proportional to the loss, with darker greys indicating more loss. In other words, the pixel intensities represent the difference between the output of rotated feature maps and the rotated output of non-rotated feature maps in the ASPP layer. The large difference between the two feature maps when $\alpha=0$ suggests the ASPP layer is breaking equivariance in conventional models. By incorporating the equivariance loss term with a greater than zero, the transformation law of the ASPP layer may be beneficially preserved compared to not using it (e.g., setting a to zero).

A Reinterpretation of Separable Convolution

In some models, the invertible residual structure naturally separates the domain of the building blocks and the layer transformation, associated respectively to the capacity and the expressiveness of the model. This can be reinterpreted in the context of equivariant networks.

For example, assume the desire to be equivariant to a group $G=G/H \rtimes H$, where $G/H$ is the base space where the convolution is actually run and H are the origin-preserving symmetries. Then, $G/H = \mathbb{R}^2$, $H=C_N < SO(2)$ and $G < SE(2)$. A bottleneck residual layer consists first of a 1×1 convolution mapping the backbone H-features to a larger dimensional H-space, followed by a non-linearity. This layer is performing group convolution over the fiber group H, but processes the point in G/H independently. The following 3×3 depthwise convolution is performed over the space G/H but processes the elements of the group H independently. After another rectified linear unit (ReLU) activation, the features are mapped back to the feature space of the backbone with another 1×1 convolution, i.e. a group convolution over H.

Note that no non-linearity is ever applied on the feature space of the backbone. This design may also be exploited to use only irreducible representations in the backbone with a low frequency cut-off (corresponding to the capacity of the model), but map to regular features in the residual block. This allows the use of locality over the group H (applying the non-linearity and the depth-wise convolution) and to build an expressive transformation function. In this case, the 1×1 convolutions can be interpreted as a learnable discrete Fourier transform (and its inverse) over the group H.

Popular architectures, such as MobileNetV2, use an inverted residual bottleneck layer which consists of a 1×1 pointwise convolution expanding the number of channels, a depth-wise convolution (e.g., using a 3×3 kernel), and another 1×1 pointwise convolution to contract the number of channels, separated ReLUs non-linearities. When equivariance is enforced Sec. 3, these operations require interpretation.

The two 1×1 convolutions are effectively group convolutions only over the rotation group, i.e. with kernels that are extended only over G. Conversely, the field of view 307 of the depthwise convolution covers a 3×3 window on the plane (the translation group), but only one single element of G corresponds to a pointwise convolution over the rotation group G. As a result, equivariance means the channels within a single block of size N to share rotated copies of the same kernel.

Figure 7:
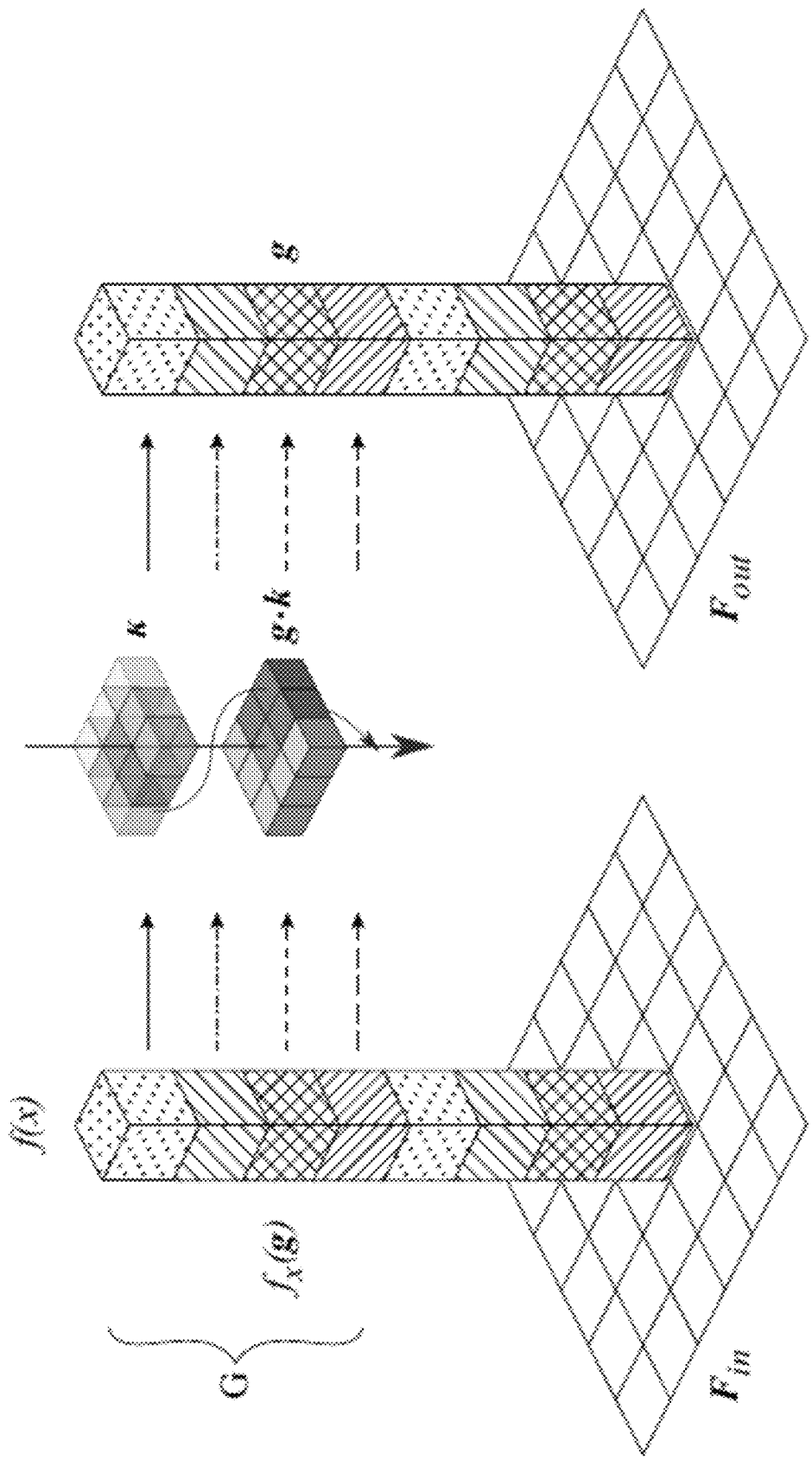
FIG. 7 depicts an example of an equivariant depthwise convolution of a feature vector as pointwise and depthwise convolutions over a rotation group.

FIG. 7 depicts an example of an equivariant depthwise convolution of feature vector as pointwise and depthwise convolutions over rotation group G(N=4).

Data-Free Quantization as a Further Improvement to Equivariant Models

An efficient architecture design may not be enough to run deep neural network models on low power devices, such as edge devices, especially in the context of time consuming tasks like segmentation. Thus, in order to further reduce the computational costs, quantization methods may be used.

Quantization generally refers to techniques for mapping input values of a first level of precision (i.e., number of bits) to output values in a second, lower level of precision (i.e., smaller number of bits). The difference between an input value and its quantized value is referred to as a quantization error. Quantization operations may change a representation, such as from a 32-bit floating point (e.g., FP32) representation into 8-bit fixed point (e.g., INT8) representation.

Because an equivariant neural network model can be converted to a conventional network after training, data free quantization can be used in addition to the equivariant model improvements described above. In particular, cross-layer range equalization and high bias absorption may be used.

Cross-layer range equalization involves exploiting the commutative property of ReLU with respect to scaling of its input, which allows adaptation of the weights of a trained neural network without affecting its behavior and, therefore, its performances. Thus, cross-layer range equalization may equalize the range of values of the weights attached to each channel in a layer in order to maximize the channel precision after quantization.

Notably, cross-layer range equalization does not affect the equivariance of a layer theoretically. Though, this holds only for perfect symmetries of the grid once filters are discretized, it can be observed that in practice the equivariance is only marginally affected. For example, consider a pair of fully connected layers such that:

$$y=W^{(2)}f(W^{(1)}x+b^{(1)})+b^{(2)}$$

Equalization involves scaling the weights with a positive diagonal matrix S as $$y=W^{(2)}Sf(S^{-1}W^{(1)}x+S^{-1}b^{(1)})+b^{(2)}$$

The diagonal of S contains elements $$s_i = \frac{\sqrt{r_i^{(1)} r_i^{(2)}}}{r_i^{(2)}},$$

where $r_i^{(1)}$ and $r_i^{(2)}$ are respectively the ranges of values of the weights $W_{i,:}^{(1)}$ and $W_{:,i}^{(2)}$. Assuming that the previous layers are equivariant to discrete rotations (i.e. $G=C_N$) and that the transformation law of all feature maps are direct sums of regular representations, it follows that a weight matrix has a block structure, where each N×N block corresponds to a group convolution and looks like a circulant matrix. As a result, all rows $W_{i,:}^{(1)}$ with i in the same N-dimensional output feature are permutations of each other and therefore share the same range of values. Likewise, all columns $W_{:,i}^{(2)}$ in the same N-dimensional input feature share the same values. Hence, $r_i^{(*)}$ is equal for all indices i within the same N-dimensional feature.

A similar argument holds for convolutional features and convolutional linear maps, though the discretization of the filters for rotations smaller than 90 degrees makes it valid only approximatively.

Additionally, because equivariance constraints enforce multiple channels and weights to share statistics, a lower variance is observable in the distributions of the weights and activations before re-normalization compared to those in the conventional counterparts.

The equalization described above also scales the entries of the bias. This, in turn, could increase the range of values it takes and, therefore, affect the range of values of the activations. If the distribution of the inputs is concentrated in the positive domain of ReLU, it is possible to exploit its linear behavior to shift the input distribution and absorb part of the bias in the following layer, which is referred to as high-bias absorption. Using the batch normalization statistics, it is possible to estimate the input distribution and correct the bias terms without additional data. Because an equivariant batch normalization layer shares statistics across each channel in the same regular feature, it is guaranteed that the bias values of the channels in the same field are shifted by the same amount, preserving the equivariance.

Figure 8:
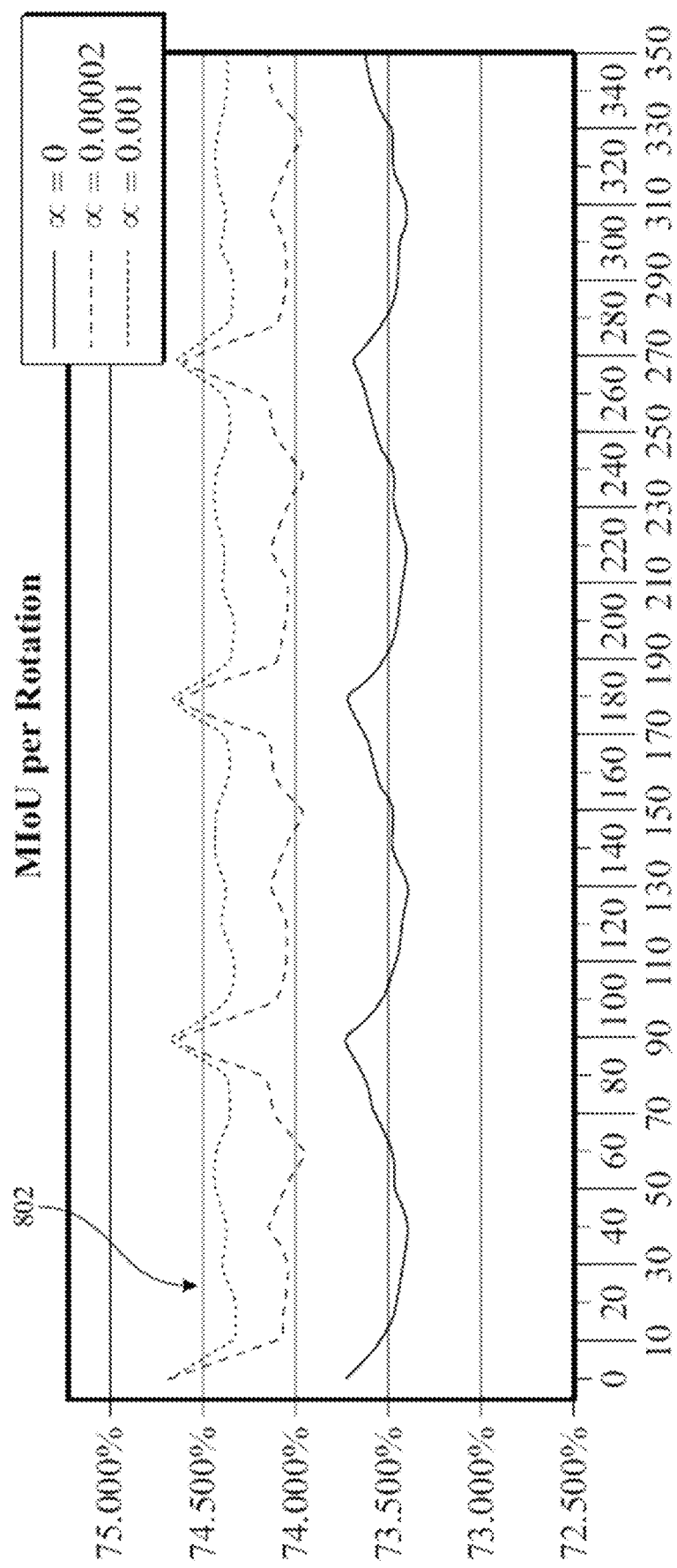
FIG. 8 depicts an example comparing the performance obtained with different choices of a hyper-parameter for a loss function.

FIG. 8 depicts an example comparing the performances obtained in terms of mean Intersection over Union (MIoU) with different choices of a hyper-parameter (α) for an equivariance loss component. Here, the equivariant model using the highest non-zero loss parameter (α) performs the best overall, as indicated by line 802.

Figure 9:
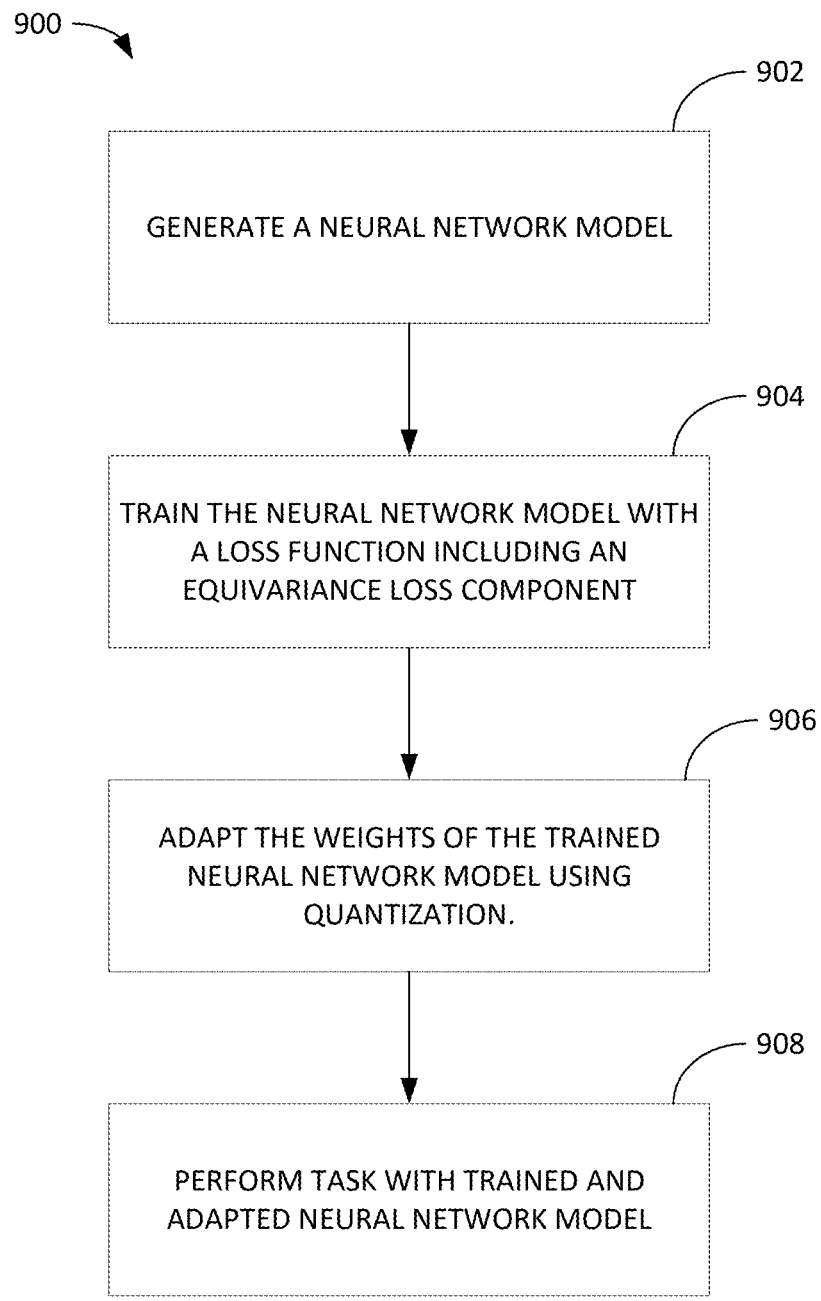
FIG. 9 depicts an example method for performing machine learning using equivariance and data quantization.

Example Method for Performing Machine Learning Using Equivariance and Data Quantization FIG. 9 depicts an example method 900 for performing machine learning using equivariance and data quantization.

Method 900 begins at step 902 with generating a neural network model.

In some embodiments, the neural network model comprises a group equivariant neural network model comprising at least one layer ϕ mapping from a feature space $F_{in} \rightarrow F_{out}$ and the at least one layer ϕ guarantees that for a transformation g in a group G and a feature map f in $F_{in}$: $\phi(g \cdot f) = g \cdot \phi(f)$.

Method 900 then proceeds to step 904 with training the neural network model with a loss function including an equivariance loss component. In some embodiments, the loss function $\mathcal{L}_{total}$ includes an equivariance loss component $\mathcal{L}_{equivarnace}$ according to $\mathcal{L}_{total} = \mathcal{L}_{task} + \alpha \mathcal{L}_{equivarnace}$ and α>0.

In some embodiments, the equivariance loss component $\mathcal{L}_{equivariance}$ for a batch size B and transformation g is: $\mathcal{L}_{equivariance}^{g}$ $$(\{f_i\}_i) := \frac{1}{B}\sum_{i=1}^{B} \frac{1}{C} \|g \cdot \phi(f) - \phi(g \cdot f)\|_2^2,$$

and C is a size of a vector in $F_{out}$.

In some embodiments, the equivariance loss component is only computed for the at least one layer ϕ.

The neural network model may be trained to perform a task, such as image classification or segmentation, on a first set of input data.

Method 900 then proceeds to step 906 with adapting the weights of the trained neural network model using quantization.

In some embodiments, the quantization comprises applying cross-layer range equalization to the trained neural network model. In some embodiments, the quantization comprises estimating the input distribution at a layer of the trained neural network model; and adjusting the bias terms for the layer based on the estimated input distribution.

In some embodiments, method 900 further includes rotating the first set of input data by a rotation angle to form a second set of input data; and training the neural network model with the second set of input data by: downsampling the second set of input data through a strided convolution in at least one layer of the neural network model; and adapting a stride and padding of the strided convolution to maintain equivariance for the at least one layer.

In some embodiments, the neural network model comprises at least one atrous spatial pyramid pooling layer. In such embodiments, the method may further include performing multiple parallel atrous convolutions using the at least one atrous spatial pyramid pooling layer with different dilations during the training with the first set of input data.

In some embodiments, method 900 further includes performing an inference with the trained neural network model on one of a mobile device or an edge device.

In some embodiments, method 900 further includes converting an architecture of the trained neural network model from an equivariant architecture to a conventional architecture; and inferencing using the trained neural network model and the conventional architecture.

Figure 10:
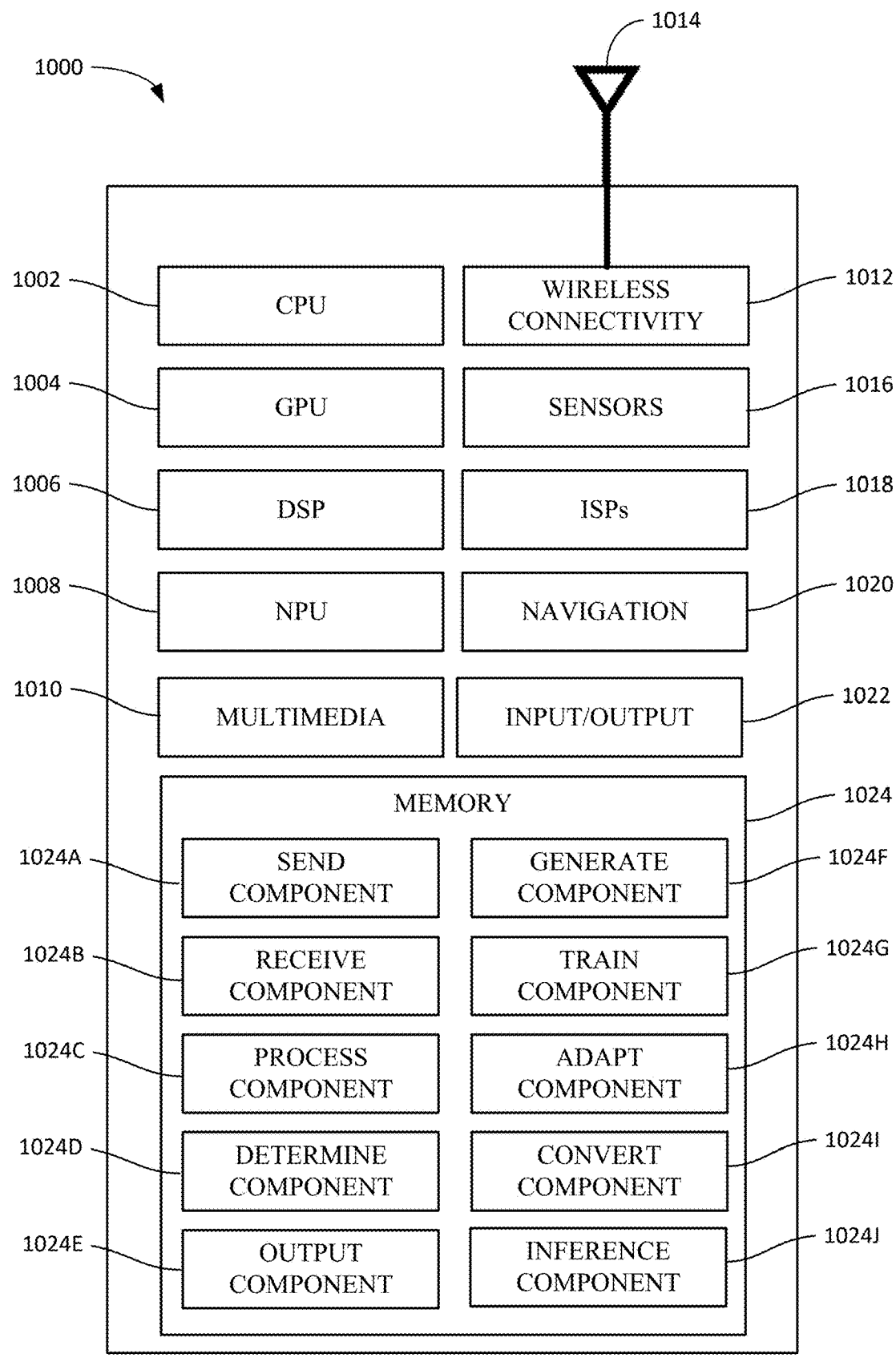
FIG. 10 depicts an example electronic device that may be configured to machine learning using equivariance and data quantization.

Example Electronic Device for Performing Machine Learning Using Equivariance and Data Quantization FIG. 10 depicts an example electronic device 1000 that may be configured to perform machine learning using equivariance and data quantization, as described herein for example with respect to FIG. 9.

Electronic device 1000 includes a central processing unit (CPU) 1002, which in some examples may be a multi-core CPU. Instructions executed at the CPU 1002 may be loaded, for example, from a program memory associated with the CPU 1002 or may be loaded from a memory partition 1024.

Electronic device 1000 also includes additional processing components tailored to specific functions, such as a graphics processing unit (GPU) 1004, a digital signal processor (DSP) 1006, a neural processing unit (NPU) 1008, a multimedia processing unit 1010, and a wireless connectivity component 1012.

An NPU, such as 1008, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), or a vision processing unit (VPU).

NPUs, such as 1008, may be configured to accelerate the performance of common machine learning tasks, such as image classification, machine translation, object detection, and various other tasks. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 1008 is a part of one or more of CPU 1002, GPU 1004, and/or DSP 1006.

In some examples, wireless connectivity component 1012 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 1012 is further connected to one or more antennas 1014.

Electronic device 1000 may also include one or more sensor processing units 1016 associated with any manner of sensor, one or more image signal processors (ISPs) 1018 associated with any manner of image sensor, and/or a navigation processor 1020, which may include satellite-based positioning system components (e.g., GPS or GLONASS) as well as inertial positioning system components.

Electronic device 1000 may also include one or more input and/or output devices 1022, such as screens, touch-sensitive surfaces (including touch-sensitive displays), physical buttons, speakers, microphones, and the like.

In some examples, one or more of the processors of electronic device 1000 may be based on an ARM or RISC-V instruction set.

Electronic device 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of electronic device 1000.

In particular, in this example, memory 1024 includes send component 1024A, receive component 1024B, process component 1024C, determine component 1024D, output component 1024E, generate component 1024F, train component 1024G, adapt component 1024H, convert component 1024I, and inference component 1024J. The depicted components, and others not depicted, may be configured to perform various aspects of the methods described herein.

Generally, electronic device 1000 and/or components thereof may be configured to perform the methods described herein.

Example Clauses

Implementation examples are described in the following numbered clauses:

Clause 1: A method of performing machine learning, comprising: generating a neural network model; and training the neural network model for a task with a first set of input data, wherein: the training uses a total loss function $\mathcal{L}_{total}$ including an equivariance loss component $\mathcal{L}_{equivarnace}$ according to $\mathcal{L}_{total} = \mathcal{L}_{task} + \alpha \mathcal{L}_{equivarnace}$, and $\alpha > 0$.

Clause 2: The method of Clause 1, wherein: the neural network model comprises a group equivariant neural network model comprising at least one layer $\phi$ mapping from a feature space $F_{in} \rightarrow F_{out}$, the at least one layer $\phi$ guarantees that for a transformation g in a group G and a feature map f $F_{in}$: $\phi(g \cdot f) = g \cdot \phi(f)$, the equivariance loss component for a batch of size B and transformation g is: $\mathcal{L}_{equivariance}^{g}$ $$(\{f_i\}_i) := \frac{1}{B} \sum_{i=1}^{B} \frac{1}{C} \|g \cdot \phi(f) - \phi(g \cdot f)\|_2^2,$$

and C is a size of a vector in $F_{out}$.

Clause 3: The method of Clause 2, wherein the equivariance loss component is only computed for the at least one layer $\phi$.

Clause 4: The method of any one of Clauses 1-3, further comprising: rotating the first set of input data by a rotation angle to form a second set of input data; and training the neural network model with the second set of input data by: downsampling the second set of input data through a strided convolution in at least one layer of the neural network model; and adapting a stride and padding of the strided convolution to maintain equivariance for the at least one layer.

Clause 5: The method of any one of Clauses 1-4, wherein: the neural network model comprises at least one atrous spatial pyramid pooling layer, and the method further comprises: performing multiple parallel atrous convolutions using the at least one atrous spatial pyramid pooling layer with different dilations during the training with the first set of input data.

Clause 6: The method of any one of Clauses 1-5, further comprising adapting weights of the trained neural network model using quantization.

Clause 7: The method of Clause 6, wherein the quantization comprises applying cross-layer range equalization to the trained neural network model.

Clause 8: The method of Clause 6, wherein the quantization comprises: estimating an input distribution at a layer of the trained neural network model; and adjusting bias terms for the layer based on the estimated input distribution.

Clause 9: The method of any one of Clauses 1-8, further comprising performing an inference with the trained neural network model on one of a mobile device or an edge device.

Clause 10: The method of any one of Clauses 1-9, further comprising: converting an architecture of the trained neural network model from an equivariant architecture to a conventional architecture; and inferencing using the trained neural network model and the conventional architecture.

Clause 11: A method, comprising: performing an inference with a neural network model, wherein the neural network was trained uses a total loss function $\mathcal{L}_{total}$ including an equivariance loss component $\mathcal{L}_{equivarnace}$ according to $\mathcal{L}_{total} = \mathcal{L}_{task} + \alpha \mathcal{L}_{equivarnace}$, and $\alpha > 0$.

Clause 12: The method of Clause 11, wherein: the neural network model comprises a group equivariant neural network model comprising at least one layer $\phi$ mapping from a feature space $F_{in} \rightarrow F_{out}$, and the at least one layer $\phi$ guarantees that for a transformation g in a group G and a feature map f in $F_{in}$: $\phi(g \cdot f) = g \cdot \phi(f)$.

Clause 13: The method of any one of Clauses 11-12, wherein the neural network model comprises at least one atrous spatial pyramid pooling layer.

Clause 14: The method of any one of Clauses 11-13 wherein the weights of the neural network model are quantized.

Clause 15: The method of Clause 14, wherein the weights were quantized using cross-layer range equalization.

Clause 16: The method of Clause 14, wherein the weights were quantized using an estimated input distribution at a layer of the neural network model; and adjusted bias terms for the layer based on the estimated input distribution.

Clause 17: The method of any one of Clauses 11-16, further comprising performing the inference with the neural network model on one of a mobile device or an edge device.

Clause 18: The method of any one of Clauses 11-17, further comprising: converting an equivariant neural network architecture to a conventional neural network architecture, wherein the neural network model comprises the conventional neural network architecture.

Clause 19: A processing system, comprising: a memory comprising computer-executable instructions; one or more processors configured to execute the computer-executable instructions and cause the processing system to perform a method in accordance with any one of Clauses 1-18.

Clause 20: A processing system, comprising means for performing a method in accordance with any one of Clauses 1-18.

Clause 21: A non-transitory computer-readable medium comprising computer-executable instructions that, when executed by one or more processors of a processing system, cause the processing system to perform a method in accordance with any one of Clauses 1-18.

Clause 22: A computer program product embodied on a computer-readable storage medium comprising code for performing a method in accordance with any one of Clauses 1-18.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of machine learning, comprising:
   converting an architecture of a neural network model from an equivariant architecture to a traditional convolutional architecture, wherein the traditional convolutional architecture is executable on an edge device; and
   performing, at the edge device, an inference with the neural network model in the traditional convolutional architecture, wherein:
      the neural network model was trained using a total loss function including a task loss component and a weighted equivariance loss component as a regularization loss component that allows the neural network model to enforce symmetries using the traditional convolutional architecture executable, and
      the weighted equivariance loss component is masked based on a mask in one or more layers of the neural network model such that features in locations of an input rotated outside of a defined area are disregarded in calculating the weighted equivariance loss component.

2. The method of claim 1, wherein:
   the neural network model comprises a group equivariant neural network model comprising at least one layer $\phi$ mapping from an input feature space $F_{in}$ to an output feature space $F_{out}$, and
   the at least one layer $\phi$ guarantees that for a transformation g in a group G and a feature map f in $F_{in}$, an output of the at least one layer $\phi$ using an input of the transformation g applied to the feature map f equals the transformation g applied to an output of the at least one layer φ using an input of the feature map f.

3. The method of claim 1, wherein the neural network model comprises at least one atrous spatial pyramid pooling layer.

4. The method of claim 1, wherein the neural network model comprises quantized weights.

5. The method of claim 4, wherein the weights of the neural network model were quantized using cross-layer range equalization.

6. The method of claim 1, wherein the edge device is a mobile device.

7. A processing system, comprising:
a memory comprising computer-executable instructions; and
one or more processors configured to execute the computer-executable instructions and cause the processing system to:
convert an architecture of a neural network model from an equivariant architecture to a traditional convolutional architecture, wherein the traditional convolutional architecture is executable on an edge device; and
perform, at the edge device, an inference with the neural network model in the traditional convolutional architecture, wherein:
the neural network model was trained using a total loss function including a task loss component and a weighted equivariance loss component as a regularization loss component that allows the neural network model to enforce symmetries using the traditional convolutional architecture, and
the weighted equivariance loss component is masked based on a mask in one or more layers of the neural network model such that features in locations of an input rotated outside of a defined area are disregarded in calculating the weighted equivariance loss component.

8. The processing system of claim 7, wherein:
the neural network model comprises a group equivariant neural network model comprising at least one layer φ mapping from an input feature space $F_{in}$ to an output feature space $F_{out}$, and
the at least one layer φ guarantees that for a transformation g in a group G and a feature map f in $F_{in}$, an output of the at least one layer φ using an input of the transformation g applied to the feature map f equals the transformation g applied to an output of the at least one layer φ using an input of the feature map f.

9. The processing system of claim 7, wherein the neural network model comprises at least one atrous spatial pyramid pooling layer.

10. The processing system of claim 7, wherein the neural network model comprises quantized weights.

11. The processing system of claim 10, wherein the weights of the neural network model were quantized using cross-layer range equalization.

12. The processing system of claim 7, wherein the edge device is a mobile device.

13. A non-transitory computer-readable medium comprising computer-executable instructions that, when executed by one or more processors of a processing system, cause the processing system to perform a method, the method comprising:
converting an architecture of a neural network model from an equivariant architecture to a conventional architecture, wherein the conventional architecture is executable on an edge device; and
performing, at the edge device, an inference with the neural network model in the conventional architecture, wherein:
the neural network model was trained using a total loss function including an equivariance loss component $\mathcal{L}_{equivarnace}$ according to $\mathcal{L}_{total} = \mathcal{L}_{task} + \alpha \mathcal{L}_{equivarnace}$, where $\mathcal{L}_{total}$ represents a total loss, $\mathcal{L}_{task}$ represents a task loss component, and α represents a weight applied to the equivariance loss component;
the equivariance loss component corresponds to a regularization loss component that allows the neural network model to enforce symmetries using the conventional architecture;
the equivariance loss component is masked based on a mask in one or more layers of the neural network model such that features in locations of an input rotated outside of a defined area are disregarded in calculating the equivariance loss component; and
α>0.

14. The non-transitory computer-readable medium of claim 13, wherein:
the neural network model comprises a group equivariant neural network model comprising at least one layer φ mapping from an input feature space $F_{in}$ to an output feature space $F_{out}$, and
the at least one layer φ guarantees that for a transformation g in a group G and a feature map f in $F_{in}$, an output of the at least one layer φ using an input of the transformation g applied to the feature map f equals the transformation g applied to an output of the at least one layer φ using an input of the feature map f.

15. The non-transitory computer-readable medium of claim 13, wherein the neural network model comprises at least one atrous spatial pyramid pooling layer.

16. The non-transitory computer-readable medium of claim 13, wherein the neural network model comprises quantized weights.

17. The non-transitory computer-readable medium of claim 16, wherein the weights of the neural network model were quantized using cross-layer range equalization.

18. The non-transitory computer-readable medium of claim 13, wherein the edge device is a mobile device.

19. A method of machine learning, comprising:
training a neural network model for a task with a first set of input data, wherein:
the training uses a total loss function including a task loss component and a weighted equivariance loss component, and
the weighted equivariance loss component is masked based on a mask in one or more layers of the neural network model such that features in locations of an input in the first set of input data rotated outside of a defined area are disregarded in calculating the weighted equivariance loss component; and
deploying the trained neural network model in an edge device.

20. The method of claim 19, wherein:
the neural network model comprises a group equivariant neural network model comprising at least one layer φ mapping from an input feature space $F_{in}$ to an output feature space $F_{out}$,
the at least one layer φ guarantees that for a transformation g in a group G and a feature map f in $F_{in}$, an output of the at least one layer φ using an input of the transformation g applied to the feature map f equals the transformation g applied to an output of the at least one layer φ using an input of the feature map f, the equivariance loss component $\mathcal{L}$ for a batch of size B and transformation g is $$\mathcal{L}_{equivariance}^{g}(\{f_i\}_i) := \frac{1}{B}\sum_{i=1}^{B}\frac{1}{C}\|g\cdot\phi(f) - \phi(g\cdot f)\|_2^2,$$

C is a size of a vector in $F_{out}$.

21. The method of claim 20, wherein the equivariance loss component is only computed for the at least one layer φ.

22. The method of claim 19, further comprising:
rotating the first set of input data by a rotation angle to form a second set of input data; and
training the neural network model with the second set of input data, wherein the training with the second set of input data comprises:
 downsampling the second set of input data through a strided convolution in at least one layer of the neural network model; and
 adapting a stride and padding of the strided convolution to maintain equivariance for the at least one layer.

23. The method of claim 19, wherein:
the neural network model comprises at least one atrous spatial pyramid pooling layer, and
the method further comprises: performing multiple parallel atrous convolutions using the at least one atrous spatial pyramid pooling layer with different dilations during the training with the first set of input data.

24. The method of claim 19, further comprising adapting weights of the trained neural network model using quantization.

25. The method of claim 24, wherein the quantization comprises applying cross-layer range equalization to the trained neural network model.

26. The method of claim 24, wherein the quantization comprises:
estimating an input distribution at a layer of the trained neural network model; and
adjusting bias terms for the layer based on the estimated input distribution.

27. The method of claim 19, further comprising performing an inference with the trained neural network model on one of a mobile device or the edge device.

28. The method of claim 19, further comprising:
converting an architecture of the trained neural network model from an equivariant architecture to a traditional convolutional architecture; and
inferencing using the trained neural network model and the conventional architecture.

* * * * *